(No Model.)
S. M. GRIFFEN.
TAILOR'S MEASURE.
No. 537,285.   Patented Apr. 9, 1895.
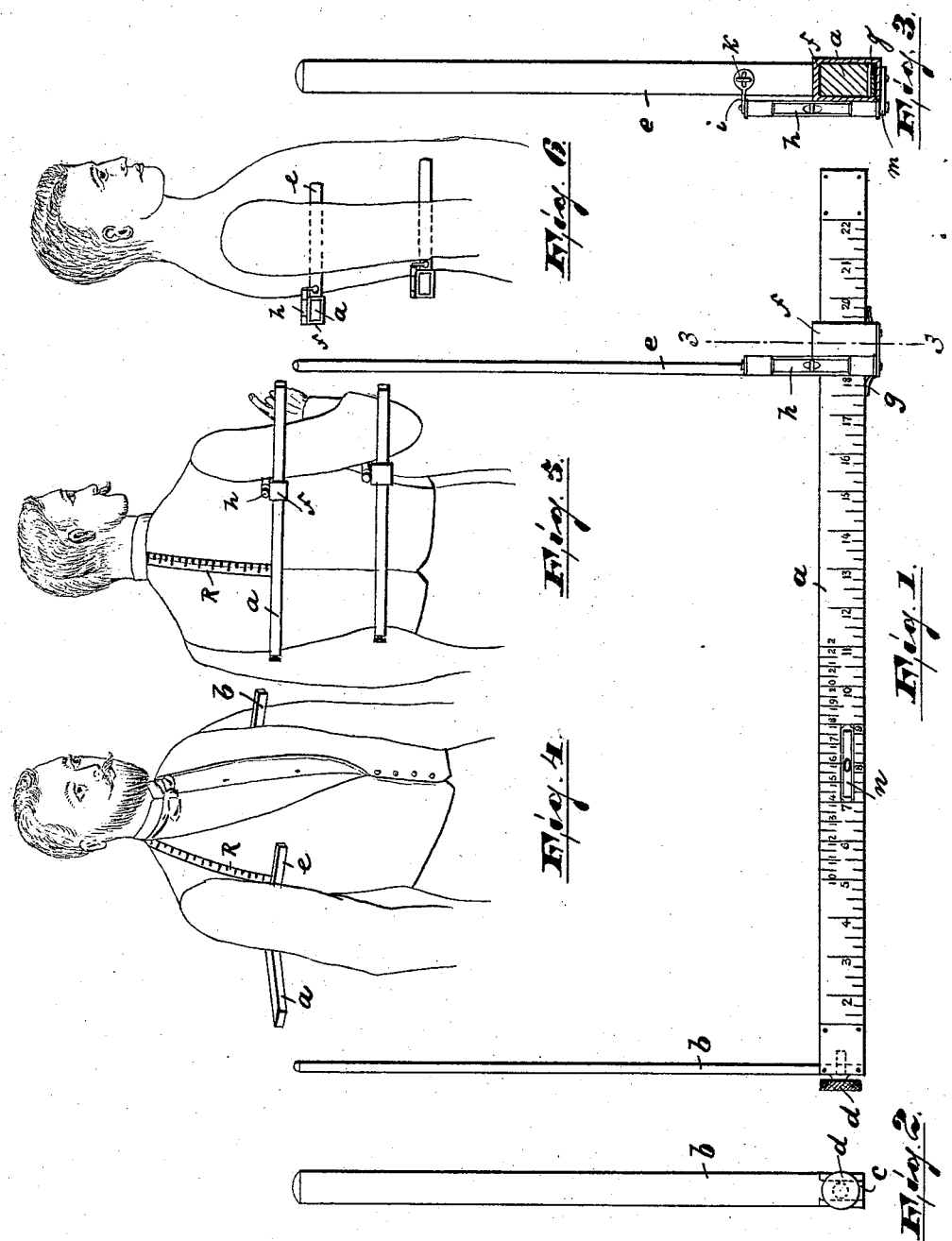
WITNESSES:
Arthur H. Thomson
Duncan W. Robertson
INVENTOR:
Stephen M. Griffen
BY
Sartner & Co
ATTORNEYS.

UNITED STATES PATENT OFFICE.

STEPHEN M. GRIFFEN, OF PATERSON, NEW JERSEY.

TAILOR'S MEASURE.

SPECIFICATION forming part of Letters Patent No. 537,285, dated April 9, 1895.

Application filed December 20, 1894. Serial No. 532,432. (No model.)

*To all whom it may concern:*

Be it known that I, STEPHEN M. GRIFFEN, a citizen of the United States, residing at Paterson, county of Passaic, and State of New Jersey, have invented certain new and useful Improvements in Measuring Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a measuring device for cloth cutters, &c., of simple, strong and durable construction and reliable in operation, and by means of which a perfect measurement of proportionate and disproportionate forms can easily be obtained.

The invention consists in the improved measuring device and in the combination and arrangement of parts, substantially as will be hereinafter more fully described and finally embodied in the clause of the claim.

Referring to the accompanying drawings, in which like letters of reference indicate corresponding parts in each of the several figures, Figure 1 is a side elevation of my improved device; Fig. 2, an end view of the left end portion thereof; Fig. 3, a sectional view on the line *x x* of Fig. 1, and Figs. 4, 5, and 6 illustrate the method of taking some of the measurements or dimensions of a human body.

In said drawings *a* represents a square arm, provided at one end with a dovetailed recess in which is secured the dovetailed end *c* of the arm or caliper *b*—by means of screw *d* or in any desired manner. The said arm *b* is arranged at right angles to the arm *a*, which latter is provided with graduation marks arranged from one inch to twenty-two inches (or more or less) and further, beginning at mark "inch 5" with a scale reduced half and numbered from 10 to 22. At the graduation mark "8" of the inch scale (and "16" of the reduced scale) is the center of a spirit level *n*, arranged in or secured to the arm *a* in any desired manner. On said arm *a* is also arranged a sleeve or squared aperture *f*, adapted to slide thereon and controlled by a flat spring *g* placed between the arm *a* and the said sleeve, as clearly shown in Figs.1 and 3. Secured to said sleeve or made integral therewith, at right angles to the arm *a* is an arm or caliper *e*, on which is arranged a spirit level *h*, one end of which is secured by means of the strip *m* to the sleeve *f*, while its other end is arranged in the slotted plate *i*, adjustably secured by a set screw *k* to the side of the arm or caliper *e*. By this way of securing the spirit level, the same can easily be trued or plumbed with the top edge of the arm *e* as will be manifest.

When used the measuring device is applied on a body as illustrated in Figs. 4, 5 and 6. The fixed arm *b* is placed on one side of the body, while the caliper *e* is slid on the arm *a* until it rests or bears against the opposite side of the body, whereby a correct measurement of the breast or hip lines is obtained.

When other dimensions are to be taken the device is placed in the same way on the body—as illustrated, and is then trued or leveled by means of the spirit level. A common tape measure R is then used in connection with the same as will be manifest.

Having thus described my invention, what I claim as new, and desire to secure by Letters Patent, is—

As a new article of manufacture, a measuring device for cloth cutters, consisting of an arm provided at one end with a dovetailed recess, a series of graduation marks, and a scale of half the number of graduation marks and of a half reduced size on said arm, the graduation marks of the reduced scale are in alignment with the graduation marks of the large scale, and are provided with numbers, said numbers being double the numbers of the graduation marks of the large scale, a spirit level in the center of the reduced scale, a caliper provided with a dovetailed end arranged in the dovetailed recess of the same and at right angles to the same, a thumbscrew removably securing the dovetailed end of the caliper to the arm, a second caliper parallel with the first one and provided at one end with a sleeve, adapted to slide on the arm, a spring controlling the sleeve a strip secured to the inside of the sleeve and projecting above the top thereof, a slotted plate arranged on one side of the sliding caliper and near its inner end thereof, a set screw penetrating said slotted plate and a spirit level supported by said strip and by the slotted plate, all said parts, substantially as and for the purposes described.

In testimony that I claim the foregoing I have hereunto set my hand this 14th day of November, 1894.

STEPHEN M. GRIFFEN.

Witnesses:
MORRIS CORINSKI,
JAMES J. VAN HOVENBERG.